June 19, 1956 H. B. BEMIS 2,750,704
FISHHOOK
Filed Aug. 23, 1954
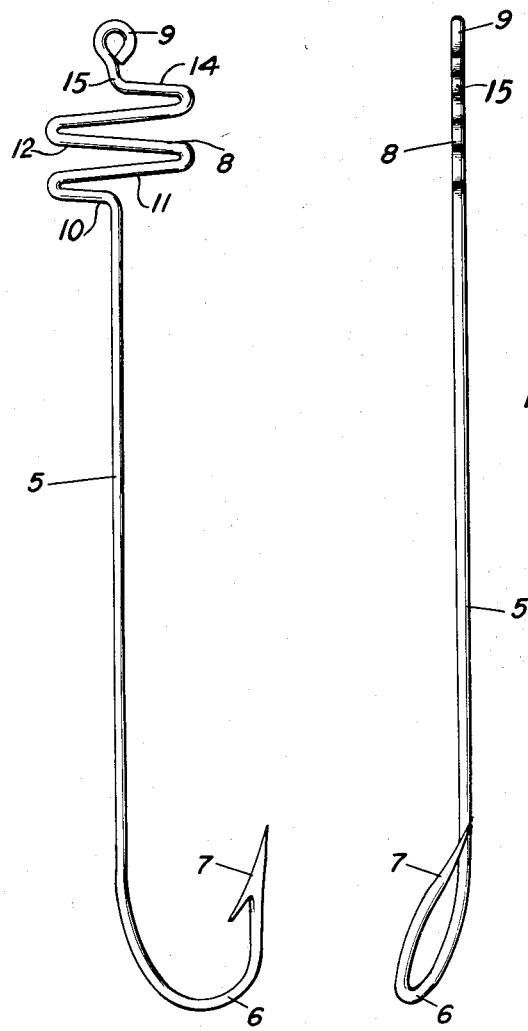
Harvey B. Bemis
INVENTOR.

United States Patent Office 2,750,704
Patented June 19, 1956

2,750,704

FISHHOOK

Harvey B. Bemis, Wheaton, Minn.

Application August 23, 1954, Serial No. 451,395

1 Claim. (Cl. 43—43.16)

The present invention relates to new and useful improvements in fish hooks and has for its primary object to provide, in a manner as hereinafter set forth, a device of this character which may be expeditiously extracted without danger of injuring the fingers on the teeth of the fish.

Other objects of the invention are to provide an improved fish hook of the aforementioned character which will be simple in construction, strong, durable, reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of a fish hook constructed in accordance with the present invention.

Figure 2 is a view in front elevation of the device.

Referring now to the drawing in detail, it will be seen that the embodiment of the invention which has been illustrated comprises a shank 5 of suitable metal, which shank is of greater than usual length. Formed integrally with the lower end of the shank 5 is a bill 6. The bill 6 terminates at its free end in a barb 7.

The upper or other end portion of the shank 5 is formed to provide a first portion 10 which extends laterally therefrom, a second portion 11 which extends laterally from said first portion 10 and in the opposite direction, a third portion 12 which extends laterally from said second portion 11 in the direction of said first portion 10, a fourth portion 13 which extends laterally from said third portion 12 in the direction of said second portion 11 and a fifth portion 14 which extends laterally from said fourth portion 13 in the direction of said third portion 12 and having an extension 15 in line with the shank 5 and terminating in an eye 9 for connecting the hook to a line or leader. The portions 11, 12 and 13 are of substantially the same length and the portions 10 and 14 are of substantially the same length. The portions 10 to 14, inclusive, provide a grip 8.

It is thought that the manner in which the invention functions will be readily apparent from a consideration of the foregoing. Briefly, the substantially flat, zig-zag portion 8 of the hook provides a substantially grid-like grip of a substantial area which is firmly gripped between the thumb and the index finger of one hand to facilitate manipulation of the hook for removing the same from the fish. The shank 5, being of a substantial length, permits the hook to be freely manipulated without danger of cutting the fingers on the teeth of the fish.

It is believed that the many advantages of a fish hook constructed in accordance with the present invention will be readily understood and although a preferred embodiment of the device is as illustrated and described, it is to be understood that changes in the details of construction may be resorted to which will fall within the scope of the invention as claimed.

What is claimed as new is as follows:

A fishhook comprising a straight shank of greater than usual length having a bill formed at one end thereof and having at its other end a first portion which extends laterally therefrom, a second portion which extends laterally from said first portion and in the opposite direction, a third portion which extends laterally from said second portion in the direction of said first portion, a fourth portion which extends laterally from said third portion in the direction of the second portion and a fifth portion which extends laterally from said fourth portion in the direction of said third portion, said second, third and fourth portions being of substantially the same length and said fifth portion being of substantially the same length as said first portion and having an extension in line with the shank which terminates in an eye, said laterally extending portions cooperating to form a grip of substantial area to facilitate the extraction of the hook from a fish.

References Cited in the file of this patent

UNITED STATES PATENTS

| | | |
|---|---|---|
| 683,750 | Guindon | Oct. 1, 1901 |
| 2,101,491 | Chilcott | Dec. 7, 1937 |
| 2,233,338 | Brewer | Feb. 25, 1941 |

FOREIGN PATENTS

| | | |
|---|---|---|
| 350,820 | Great Britain | June 18, 1931 |